US006196725B1

United States Patent
Brown

(10) Patent No.: US 6,196,725 B1
(45) Date of Patent: Mar. 6, 2001

(54) LONG-LIVED ROTARY BALL BEARING FOR RECIPROCATING APPLICATIONS AND METHOD OF LUBRICATING SAME

(75) Inventor: David C. Brown, Northborough, MA (US)

(73) Assignee: GSI Lumonics, Inc., Billerica, MA (US)

( * ) Notice: Subject to any disclaimer, the term of this patent is extended or adjusted under 35 U.S.C. 154(b) by 0 days.

(21) Appl. No.: 09/274,402

(22) Filed: Mar. 23, 1999

(51) Int. Cl.$^7$ .................................................... F16C 19/00
(52) U.S. Cl. ................................................................ 384/461
(58) Field of Search ................................. 384/461; 1/462

(56) References Cited

U.S. PATENT DOCUMENTS

| | | | | |
|---|---|---|---|---|
| 1,574,470 | * | 2/1926 | Coffee ................................... | 384/461 |
| 2,647,807 | * | 8/1953 | Brunstrum ............................ | 384/461 |
| 3,025,114 | * | 3/1962 | Beecher ................................ | 384/461 |
| 3,547,503 | * | 12/1970 | Konet .................................... | 384/461 |
| 3,597,029 | * | 8/1971 | Marcum ................................ | 384/461 |
| 3,671,093 | * | 6/1972 | Wieck ................................... | 384/461 |
| 5,138,477 | * | 8/1992 | Omura et al. ..................... | 384/461 X |

FOREIGN PATENT DOCUMENTS

1326801 * 7/1987 (RU) .................................. 384/461

* cited by examiner

*Primary Examiner*—Charles A. Marmor
*Assistant Examiner*—Roger Pang
(74) *Attorney, Agent, or Firm*—Cesari and McKenna

(57) ABSTRACT

A rotary bearing includes concentric radially spaced-apart inner, intermediate and outer rings whose opposing surfaces define inner and outer ball tracks. An inner array of balls roll along the inner track and an outer array of balls roll along the outer track and a viscous lubricant is present between the rings. When the inner and outer rings are angularly reciprocated relative to one another, the intermediate ring is moved intermittently in a selected direction about the rotation axis so that the balls recirculate about the axis and redistribute lubricant along the tracks. In a preferred embodiment, the relative angular excursion of the inner and outer rings is increased periodically beyond a selected maximum angle to effect the advancement of the intermediate ring using the lubricant as a ratcheting mechanism.

1 Claim, 1 Drawing Sheet

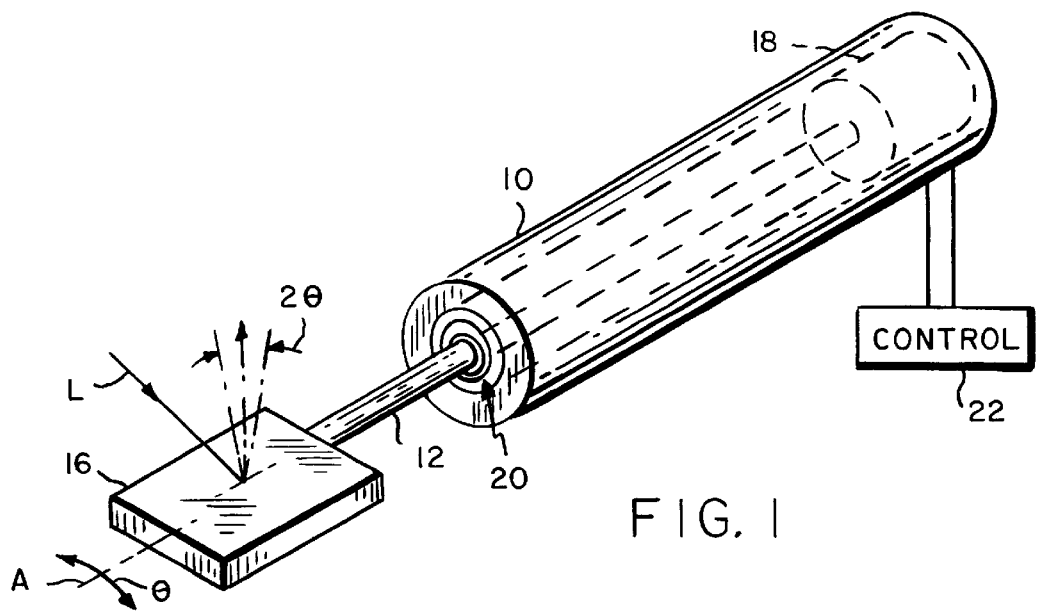
FIG. 1
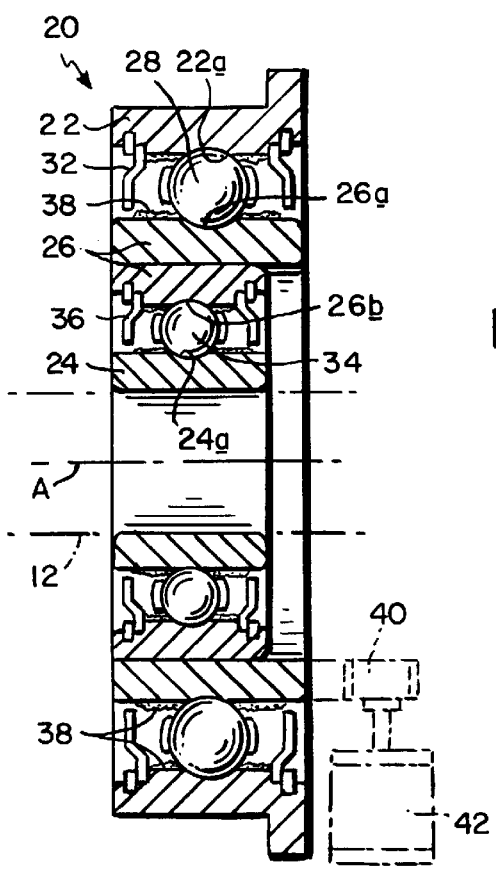
FIG. 2
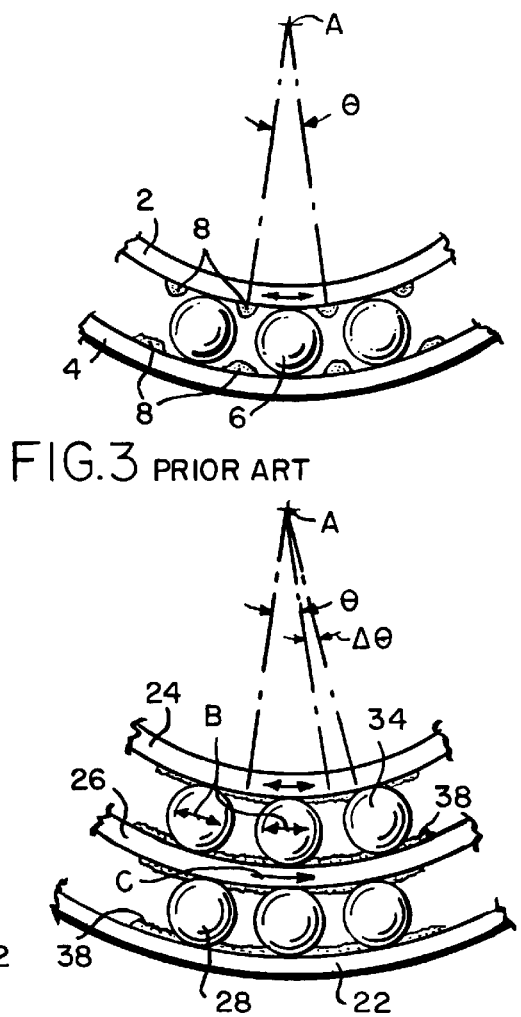
FIG. 3 PRIOR ART
FIG. 4

LONG-LIVED ROTARY BALL BEARING FOR RECIPROCATING APPLICATIONS AND METHOD OF LUBRICATING SAME

This invention relates to a rotary ball bearing. It relates especially to a bearing used to facilitate reciprocating rotary motion of a shaft or the like and to a method of distributing or replenishing lubricant in such a bearing.

BACKGROUND OF THE INVENTION

Typically, a rotary ball bearing for a shaft or the like is constructed with two rings, namely an inner ring mounted to the shaft and an outer ring mounted to a stationary support or housing. The two rings define opposing races and are separated by a circular array of balls. Relative rotation of the rings results in the rolling of the balls along the races in the rings. In order to reduce rolling friction and to minimize wear of the bearing parts, the bearing is normally lubricated with a viscous lubricant such as oil or grease which occupies the spaces between the balls and the walls of the races. If the bearing is pre-loaded axially so that the internal clearances between the parts of the bearing are more or less removed, the balls are constrained against "skidding" in their races during normal operation of the bearing. In other words, the initial relationship between the balls and the races is fixed. Thus, if one bearing ring is rotated relative to the other back and forth through a small angle in reciprocation, each ball of the bearing rolls over a definite portion of the race in each ring and is constrained to roll over these same small areas of the races as long as the bearing remains in use.

FIG. 3 shows a conventional rotary bearing as might be used in a reciprocating device such as a galvanometer. The bearing comprises an inner ring 2 and a concentric outer ring 4, the two rings being separated radially by balls 6 which roll in races defined by the opposing surfaces of the rings. In cross section, those races may have cylindrical or, more often, elliptical curvature so stresses are highest where the radially inner and outer poles of the balls contact the bottoms of the races. A lubricant is invariably provided between the rings to minimize wear of the bearing parts. In a typical application, e.g., a shaft bearing for a galvanometer, the inner ring 2 may be angularly reciprocated relative to outer ring 4 about an axis A through a small angle θ of, say, 0°–15°. Since the balls 6 roll along the same small segments of the races, after only a few minutes of operation, the lubricant present in the reciprocating ball bearing is squeezed out of the high-pressure regions between the balls and the races, primarily at the ball poles which contact the bottoms of the races. After only a relatively few reciprocations of the bearing ring 2 through an angle θ of, say, 8°, small lubricant "hills" 8 build up in the races at the extreme ends of each ball's excursion along the races. Since the angle θ through which the bearing rings 2 and 4 rotate relatively is always the same, there is no mechanism to return the lubricant 8 to the high-pressure areas of the bearing between the ball poles and bottoms of the races where it is needed. Resultantly, those areas tend to wear excessively.

If now the bearing rings 2 and 4 are caused to rotate relatively through a larger angle θ of, say 10° for one reason or another, the lubricant hills 8 deposited as aforesaid will increase the torque required to rotate the bearing momentarily. Of course, once the new angular excursion of the bearing ring 2 is established, the original lubricant hills 8 will disappear and reform on the races at the new extremes of ball travel. This process goes on continuously for the life of the lubricant in a bearing used in a random reciprocating application and may not be noticed. Eventually however, all of the excess lubricant is "parked" at the extremes of the allowed bearing ball travel and thereafter has no great affect on day-to-day bearing operation. However, as noted above, the lubricant is not present in the high-pressure areas of the bearing where it is most needed. Consequently, excessive wear occurs at those locations so that the bearing has a relatively short useful life. In fact, the aforesaid lubricant parking phenomenon is the main cause of bearing failure in most reciprocating bearings since, unless one bearing ring can rotate completely around relative to the other, the excess lubricant is effectively lost to the lubricant replenishment process. This is why many failed bearings seem to have plenty of lubricant remaining in them. The lubricant is in fact there, but it is not available at the high-pressure areas of the bearings where it is most needed.

SUMMARY OF THE INVENTION

Accordingly, it is an object of the present invention to provide a long-lived ball bearing for reciprocating applications.

Another object of the invention is to provide an improved ball bearing for the reciprocating shaft of a galvanometer.

Another object of the invention is to provide a bearing of this type which has improved wear characteristics.

A further object of the invention is to provide a method of prolonging the life of a rotary ball bearing used in reciprocating applications.

Yet another object of the invention is to provide a method of redistributing the lubricant in a rotary shaft bearing.

Other objects will, in part, be obvious and will, in part, appear hereinafter.

The invention accordingly comprises several steps and the relation of one or more of said steps with respect to each of the others, and the article processing the features, properties and relation of elements which are exemplified in the following detailed description, and the scope of the invention will be indicated in the claims.

Briefly, my rotary bearing comprises at least three radially spaced concentric rings separated by at least two circular arrays of balls located between adjacent rings. The opposing faces of the rings define races and the balls in each array are separated by a cage enabling the balls to roll along the races defined by those rings. Typically, balls in the inner array are fewer and smaller than those in the outer array and the race crossections may have various shapes depending upon the particular application. In any event, the intermediate ring acts as the outer ring with respect to the inner array of balls and as the inner ring with respect to the outer array of balls.

Thus, the relationship between the rings and balls is no longer fixed because the intermediate ring can roll on both sets of balls independently of the inner and outer ring. As we shall see, this enables each ball to travel around the circumferences of its races or tracks even though the inner and outer rings only reciprocate relatively. To put it another way, if the inner and outer rings are fixed relatively, the intermediate ring is still free to rotate about the axis of the bearing thereby allowing the balls in each array to roll along their respective races independently of the angular relationship of the inner and outer rings.

It will be appreciated from the foregoing that as long as each array of balls can roll along the entire circumference of the track defined by the corresponding pair of adjacent rings, there will be no build-up of lubricant hills along the races defining that track. Because the recirculating arrays of balls will constantly redistribute or replenish the lubricant along the races, particularly at the bottoms of the races where it is most needed, bearing wear will be minimized.

An important aspect of the present invention, then, is to assure that the intermediate ring does rotate when the bearing is in use. This may be done by mechanical means, e.g., by periodically engaging and rotating the intermediate ring using external means. However, it is most preferably accomplished by utilizing a ratcheting effect produced by the bearing lubricant on the intermediate ring when the inner and outer rings are reciprocated relatively beyond the normal angular excursion. As we shall see, this results in the bearing lubricant being recirculated around the circumference of the bearing races so that the lubricant is always present at the bottoms of the races where stresses are maximum, thereby greatly increasing the life expectancy of the bearing.

BRIEF DESCRIPTION OF THE DRAWING

For a fuller understanding of the nature and objects of the invention, reference should be made to the following detailed description taken in connection with the accompanying drawing, in which:

FIG. 1 is a perspective view of a galvanometer incorporating a bearing made in accordance with the present invention;

FIG. 2 is a cross-sectional view of the bearing in FIG. 1;

FIG. 3, already described, is a diagrammatic view illustrating the operation of a conventional bearing, and FIG. 4 is a similar view showing the operation of the FIG. 2 bearing.

DETAILED DESCRIPTION OF AN ILLUSTRATIVE EMBODIMENT

Refer now to FIG. 1 which shows a galvanometer comprising a generally cylindrical housing 10 which rotatably supports a shaft 12. One end of the shaft projects from the housing and supports a small mirror 16. The opposite end of the shaft is connected to the armature of an electric motor 18 mounted within the housing. Shaft 12 is rotatably supported within the housing by at least one rotary ball bearing 20 made in accordance with this invention so that the shaft can be rotated relative to the housing by motor 18. At least one other similar bearing (not shown) may located along shaft 12.

As in any conventional galvanometer, motor 18 is controlled by signals from a control 22 so as to angularly reciprocate shaft 12 through an angle θ which may vary from, say, 0° to 15°. Thus, if the mirror 16 is illuminated by a light beam L, the nutating mirror 16 will cause the light beam reflected from the mirror to sweep through the angle 2θ as shown in that figure. A conventional rotary ball bearing used in a galvanometer such as this or in any other reciprocating application would suffer the disadvantages described at the outset. To avoid this, each bearing 20 has the construction depicted in FIG. 2.

As shown is FIG. 2, bearing 20 comprises an outer ring 22 which may be flanged as shown, or not, for seating in housing 10 (FIG. 1), an inner ring 24 for engaging around shaft 12 and an intermediate ring 26 situated between the outer and inner rings, all of the rings being concentric to axis A. The intermediate ring 26 is illustrated as being composed of two parts. However, it could just as well be a single part. The outer ring 22 and intermediate ring 26 are separated by a circular array of balls 28. Balls 28 roll along a race 22a on the radially inner surface of outer ring 22 and a race 26a on the radially outer surface of intermediate ring 26. The two races 22a and 26a define a circular track for balls 28, the balls 28 being spaced apart along their track by a more or less conventional cage 32.

The inner ring 24 and intermediate ring 26 are spaced apart by a second array of balls 34 which roll along a race 24a on the radially outer surface of inner ring 24 and a race 26b in the radially inner surface of intermediate ring 26. Balls 34 are retained in place by the usual cage 36. A typical viscous lubricant such as oil or grease is present in the spaces between the rings as indicated at 38 in FIG. 2.

When motor 18 reciprocates shaft 12 and mirror 16 through an angle θ, the inner ring 24 reciprocates through that same angle, while the outer ring 22 remains stationary, being fixed to housing 10.

In a three-ring bearing such as bearing 20, the balls 34 in the inner array are smaller than balls 28 in the outer array and there are fewer of them. Therefore, the bearings will normally display a lower operating torque between the inner ring 24 and the intermediate ring 26 as a result of the smaller number of balls in the inner array of balls 34 and the shorter radius of action of those balls. As a result, the shaft 12 will tend to reciprocate the inner ring 24 through the angle θ, while the intermediate ring 26 remains stationary. Thus, each ball 34 will roll back and forth along its track between rings 24 and 26 a short distance as indicated by the arrow B in FIG. 4. Therefore, as discussed above, hills of lubricant could build up in the races at the opposite ends of each ball's travel path as discussed in connection with FIG. 3. However, if motor 18 in FIG. 1 is controlled by controller 22 so as to periodically rotate shaft 12 through an angular increment Δθ beyond the usual angle θ (i.e., θ+Δθ) as indicated in FIG. 4, the torque increase caused by the balls 34 contacting the lubricant hills will cause the inner ring 24/intermediate ring 26 operating torque to exceed the intermediate ring 26/outer ring 22 operating torque momentarily, with the result that the intermediate ring 26 will rotate with respect to the stationary outer ring 22 as shown by the arrow C in FIG. 4.

As soon as motor 18 resumes reciprocating shaft 12 at the original angle θ, the inner ring 24 will again rotate with respect to the intermediate ring 26, that ring again being stationary with respect to the outer ring. However, since the intermediate ring 26 did rotate momentarily as aforesaid, the balls 34 will now rotate along different sectors of their races 24a and 26b than they did originally.

The same is true with respect to the outer array of balls 28. In other words, due to the aforesaid rotation of intermediate ring 26 as shown at C, balls 28 will roll along slightly different travel paths in their races 22a and 26a than they did before shaft 12 was rotated through the angular increment Δθ. Any hills of parked lubricant 38 formed originally on recess 22a, 26a will be rolled flat by the balls 28 and the lubricant 38 will be carried into new rolling areas along those races as a result of the contacts between the balls and the lubricant hills.

It will be appreciated from the foregoing, then, that by repeating the process of interrupting the normal maximum excursion of the reciprocating motion of shaft 12 with a slightly larger angular excursion of the shaft, the intermediate ring 26 will eventually make a complete revolution about axis A. Resultantly, balls 28 and 34 will be recirculated in their respective races thereby effecting a redistribution of the lubricant 38 along the races so long as the galvanometer is in operation. Thus, reserve lubricant present in the low pressure zones between the balls and the races will constantly replenish the lubricant film which is squeezed out of the operating high pressure zones at the boundaries of the ball poles and the bottoms of the races.

When operated as described above, a bearing with at least three rings when used in galvanometers or other devices which rotate a shaft over angles smaller than that which allows each bearing ball to roll completely around its circular track will have a long life expectancy as compared with a conventional two-ring bearing. In the case of a typical galvanometer employing a two-ring bearing and with a maximum rotation of the inner ring with respect to the outer ring of 30°, but typically less than 15°, the life expectancy increase obtained by substituting a three-ring bearing operated in accordance with this invention should be in the order of three times.

It will thus be seen that the objects set forth above, among those made apparent from the preceding description are efficiently attained. Also, certain changes may be made in carrying out the above method and in the construction set forth without departing from the scope of the invention. For example, as shown in phantom in FIG. 2, one end of the intermediate ring 26 may be formed as a ring gear and be turned intermittently by a spur gear 40 rotated by a step motor 42. Also, the bearing may include more than three rings. Therefore, it is intended that all matter contained in the above description or shown in the accompanying drawing shall be interpreted as illustrative and not in a limiting sense.

It is also to be understood that the following claims are intended to cover all of the generic and specific features of the invention described herein.

What is claimed is:

1. A rotary bearing comprising an inner circular ring;

an intermediate circular ring spaced radially from the inner ring;

an outer circular ring spaced radially from the intermediate ring, all of said rings being concentric to a common axis, said inner and intermediate rings having opposing surfaces defining a first circular ball track and said intermediate and outer rings having opposing surfaces defining a second circular ball track;

a first array of balls received in the first track;

a second array of balls received in the second track;

a viscous lubricant in the tracks;

reciprocating means for angularly reciprocating the inner and outer rings relatively through a range of angles up to a selected maximum angle, and control means for controlling the reciprocating means to intermittently increase said relative angular reciprocation beyond said maximum angle whereby said first and second arrays of balls are advanced in a selected direction along said first and second tracks respectively, so that said balls recirculate about said axis and redistribute said lubricant along said tracks.

* * * * *